Jan. 5, 1954     W. R. TOMCHEK     2,664,770
HOLDING DEVICE FOR FLANGE BOLTS
Filed Feb. 2, 1953
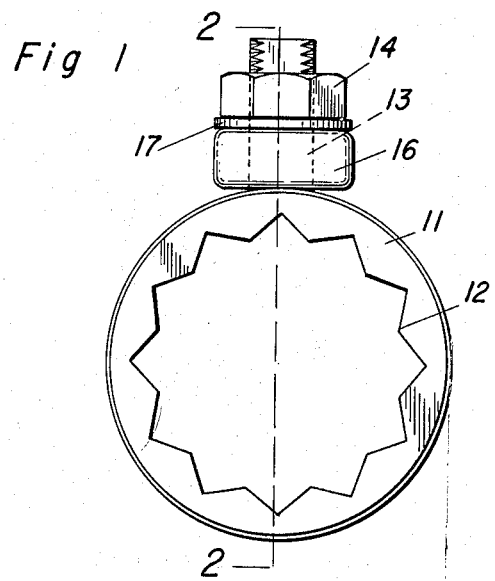
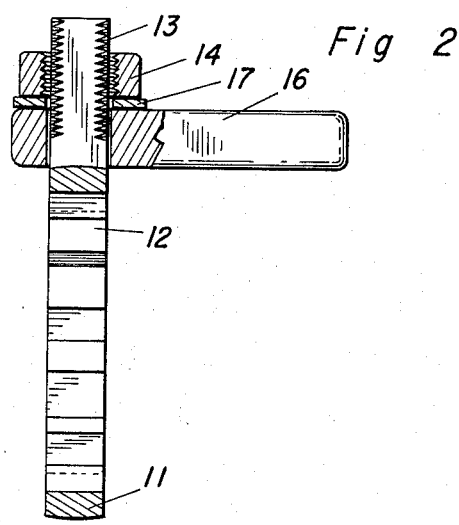
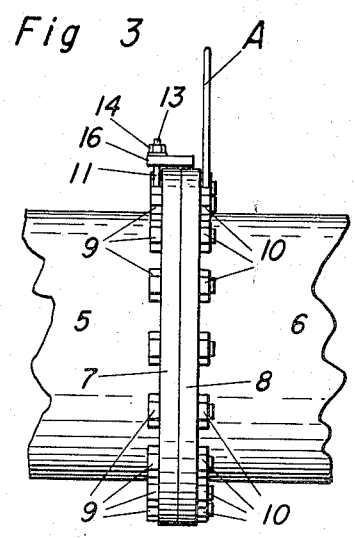
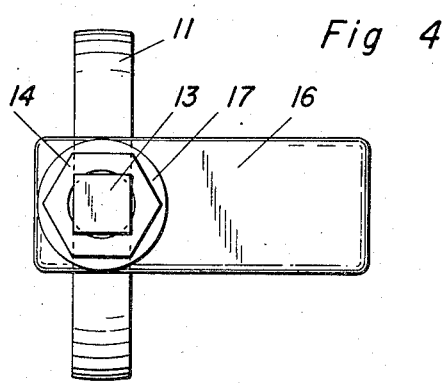
INVENTOR.
Walter R. Tomchek
BY
ATTY.

Patented Jan. 5, 1954

2,664,770

UNITED STATES PATENT OFFICE 2,664,770

HOLDING DEVICE FOR FLANGE BOLTS

Walter R. Tomchek, San Francisco, Calif.

Application February 2, 1953, Serial No. 334,530

1 Claim. (Cl. 81—13)

This invention relates to improvements in tools and has particular reference to a flange wrench.

The principal object of this invention is to produce a wrench which will engage and hold the head of the bolt of a flange-securing bolt so that an ordinarily wrench may be used for removing the nut of the bolt.

A further object is to produce a device of this character which may be used in a very restricted place in counter-distinction to a long-handled wrench.

A further object is to produce a device of this character which is easy to manufacture, one which is readily transportable and one which is adjustable to fit different bolt positions with relation to the edge of the flange.

Other objects and advantages will be apparent during the course of the following description.

In the accompanying drawings forming a part of this specification and in which like numbers are employed to designate like parts throughout the same Fig. 1 is a front elevation of the bolt-engaging ring;

Fig. 2 is a fragmentary cross sectional view taken on the line 2—2 of Fig. 1;

Fig. 3 is a fragmentary side elevation of a flange having my invention applied thereto; and Fig. 4 is a top plan view of Fig. 2.

There are many instances where pipes are joined together by flanges which flanges are bolted together by a series of spaced bolts. As the nuts on these bolts have to be tightened so there will be no leakage between the flanges, it is customary to use two wrenches, one for the head of the bolt and the other for the nut.

Sometimes it is necessary, particularly on a large pipe, to employ two men, one upon each wrench. It is also true, particularly on shipboard, that there are places where it is almost impossible to use two wrenches due to restricted working space both as to the wrench and the operator.

Applicant has therefore devised a flange wrench which, when adjusted upon the head of the bolt, has a pad bearing on the peripheral surface of the abutting flanges so as to hold the bolt against rotation, while an ordinary open-ended wrench is employed for loosening or tightening the nut.

In the accompanying drawings, wherein for the purpose of illustration is shown a preferred embodiment of my invention, the numerals 5 and 6 designate two sections of pipe, each of which carries a flange as shown at 7 and 8 respectively.

These flanges are in turn held together by bolts, the heads of which are shown at 9 and the nuts of which are shown at 10.

My invention consists of a ring-like member 11 which has serrations 12 formed upon its inner periphery. These serrations are such that they will engage the corners of a bolt head when the ring is placed over the bolt head, thus locking the ring to the bolt head.

At 13 I have shown a squared extension which is threaded so as to receive a nut 14 and a holding pad 16, and a washer shown at 17.

In use the ring 11 is placed over the head of the bolt and the nut 14 tightened until the pad 16 rests upon the peripheral surface of the flange as shown in Fig. 3.

Now, by employing a wrench A of any desired type, the nut 10 can be tightened or loosened without any danger of the bolt turning. It is apparent that through the adjustment feature, the device can be applied to any bolt whether it be close to the periphery of the flange or spaced a distance therefrom. Also, by having rings of various sizes, different sized bolt heads can be engaged.

Through the use of this device it is apparent that one operator is eliminated and also that the device can be used in very confined areas.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a flange bolt-holding device, a ring-shaped member having its inner surface serrated, a threaded extension formed on said ring, a bearing pad slidably positioned on said extension and having its bearing surface at a right angle to the plane of the ring, and an adjusting nut threadedly engaging said extension whereby the bearing pad will abut the periphery of a flange when the ring-shaped member is engaged over the head of a flange bolt.

WALTER R. TOMCHEK.

References Cited in the file of this patent

UNITED STATES PATENTS

| Number | Name | Date |
| --- | --- | --- |
| 1,251,347 | Davis | Dec. 25, 1917 |
| 1,431,832 | Mills et al. | Oct. 10, 1922 |
| 1,440,377 | Crumley | Jan. 2, 1923 |